US012070992B2

(12) United States Patent
Dylewski, II et al.

(10) Patent No.: US 12,070,992 B2
(45) Date of Patent: Aug. 27, 2024

(54) ROLLING TONNEAU COVER

(71) Applicant: Leer Group, Elkhart, IN (US)

(72) Inventors: Eugene A. Dylewski, II, Granger, IN (US); Christopher David Mattison, Granger, IN (US); John William Bevis, III, Mishawaka, IN (US)

(73) Assignee: Leer Group, Elkhart, IN (US)

( * ) Notice: Subject to any disclaimer, the term of this patent is extended or adjusted under 35 U.S.C. 154(b) by 0 days.

(21) Appl. No.: 18/144,571

(22) Filed: May 8, 2023

(65) Prior Publication Data

US 2023/0271490 A1 Aug. 31, 2023

Related U.S. Application Data

(63) Continuation of application No. 17/396,722, filed on Aug. 8, 2021, now Pat. No. 11,642,947, which is a continuation of application No. 16/655,664, filed on Oct. 17, 2019, now Pat. No. 11,084,361.

(60) Provisional application No. 62/750,343, filed on Oct. 25, 2018.

(51) Int. Cl.
*B60J 7/14* (2006.01)
*B60J 7/08* (2006.01)
*B60R 5/04* (2006.01)

(52) U.S. Cl.
CPC .............. *B60J 7/141* (2013.01); *B60J 7/085* (2013.01); *B60R 5/047* (2013.01)

(58) Field of Classification Search
CPC ... B60J 7/085; B60J 7/102; B60J 7/104; B60J 7/141; B60P 7/04

USPC ........... 296/100.01, 100.11, 100.13, 100.15, 296/100.16

See application file for complete search history.

(56) References Cited

U.S. PATENT DOCUMENTS

| | | | | |
|---|---|---|---|---|
| 5,207,262 A * | 5/1993 | Rushford | ................. | B60J 7/102 160/354 |
| 6,053,558 A * | 4/2000 | Weldy | ...................... | B60J 7/102 160/381 |
| 7,815,239 B1 * | 10/2010 | Schmeichel | ............. | B60J 7/104 296/136.01 |
| 7,963,585 B2 * | 6/2011 | Jones | ...................... | B60J 7/104 296/100.18 |
| 8,632,114 B2 * | 1/2014 | Yue | .......................... | B60J 7/141 296/100.04 |
| 8,857,887 B1 * | 10/2014 | Schmeichel | ............. | B60P 7/04 296/100.18 |
| 9,868,342 B2 * | 1/2018 | Xu | ........................... | B60J 7/061 |
| 2012/0007383 A1 * | 1/2012 | Schmeichel | ............. | B60J 7/104 296/100.16 |

(Continued)

OTHER PUBLICATIONS

Extended European Search Report 24166042.2; Dated Jul. 4, 2024.

*Primary Examiner* — Jason S Daniels
(74) *Attorney, Agent, or Firm* — Barnes & Thornburg LLP

(57) ABSTRACT

A tonneau cover assembly that selectively covers a truck bed of a truck is provided. The tonneau cover assembly includes a cover and a longitudinally extending rail located adjacent a sidewall of the truck bed. The longitudinally extending rail includes an attachment member. The attachment member extends longitudinally along with the rail and at least a portion of the attachment member is located over a portion of the bed. The cover includes a stiffener located adjacent the attachment member of the longitudinally extending rail.

19 Claims, 15 Drawing Sheets

(56) References Cited

U.S. PATENT DOCUMENTS

2015/0225022 A1* 8/2015 Schmeichel .............. B60P 7/04
  296/100.16
2016/0355078 A1 12/2016 Williamson
2017/0259655 A1 9/2017 Dylewski, II

* cited by examiner

ROLLING TONNEAU COVER

RELATED APPLICATIONS

The present Application is a Continuation Application of Continuation application Ser. No. 17/396,722 filed on Aug. 8, 2021, entitled "Rolling Tonneau Cover" and U.S. patent application Ser. No. 16/655,664 filed on Oct. 17, 2019, Now U.S. Pat. No. 11,084,361, entitled "Rolling Tonneau Cover." The present Application also relates to and claims priority to U.S. Provisional Patent Application, Ser. No. 62/750,343 filed on Oct. 25, 2018. The subject matter disclosed in these Applications is hereby expressly incorporated into the present Application.

TECHNICAL FIELD AND SUMMARY

The present disclosure relates to trucks, such as pickup trucks, and truck beds used on pickup trucks and like vehicles. In particular, the present disclosure relates to a flexible rollable truck bed cover, also known as a rollable tonneau cover that releasably secures to the truck.

Flexible tonneau or truck bed covers provide a covering for a truck bed when used in combination with the truck bed's upward-extending sidewalls and tailgate. Supported by the sidewalls and suspended over the bed of the truck, the truck bed cover helps create a concealed compartment where items may be stored out of view when the tailgate is up.

An illustrative embodiment of the present disclosure provides a tonneau cover assembly that selectively covers a truck bed of a truck. The tonneau cover assembly comprises a cover and a longitudinally extending rail located adjacent a sidewall of the truck bed. The longitudinally extending rail includes an attachment member. At least a portion of the attachment member has a planar body. The attachment member also extends longitudinally with the longitudinally extending rail and the at least a portion of the attachment member is located over a portion of the truck bed. The at least a portion of the attachment member is inclined with respect to a top surface of the sidewall. The cover includes a stiffener located on an underside of the cover and adjacent the attachment member of the longitudinally extending rail. The stiffener also has a body that is more rigid than the cover. The stiffener further includes a depending rib extending from the stiffener toward the attachment member. The rib also engages a surface of the attachment member to space apart a portion of the cover from the attachment member.

In the above and other illustrative embodiments, the tonneau cover assembly may further comprise: the cover being made of a flexible material; the attachment member including an attachment slot sized and configured to receive a portion of a hook and loop fastener; the stiffener being composed of a material selected from the group consisting of at least one of an extruded rubber and a thermoplastic elastomer; the stiffener and rib extending longitudinally adjacent the attachment member; a hook and loop fastener oriented transversely to the top surface of the sidewall to create a tension force; and the rail including a bracket that extends downwardly with respect to the attachment member and located adjacent the sidewall.

Another illustrative embodiment of the present disclosure provides a tonneau cover assembly that selectively covers a truck bed of a truck. The tonneau cover assembly comprises a cover and a longitudinally extending rail located adjacent a sidewall of the truck bed. The longitudinally extending rail includes an attachment member. At least a portion of the attachment member has a planar body. The attachment member extends longitudinally along with the rail and the at least a portion of the attachment member is located over a portion of the bed. The cover includes a stiffener located adjacent the attachment member of the longitudinally extending rail. The stiffener also includes a rib extending from the stiffener and the rib contacts a surface of the attachment.

In the above and other illustrative embodiments, the tonneau cover assembly may further comprise: at least a portion of the attachment member being inclined with respect to a top surface of the sidewall; the stiffener being located on an underside of the cover; the stiffener has a body that is more rigid than the cover; the rib extends downwardly from the stiffener; and the rib separates a portion of the cover from the attachment member.

Another illustrative embodiment of the present disclosure provides a tonneau cover assembly that selectively covers a truck bed of a truck. The tonneau cover assembly comprises a cover. A portion of the cover includes a longitudinally extending stiffener. The longitudinally extending stiffener includes a rib extending from the longitudinally extending stiffener. The rib contacts a surface of the attachment.

In the above and other illustrative embodiments, the tonneau cover assembly may further comprise: a longitudinally extending rail located adjacent a sidewall of the truck bed; the longitudinally extending rail includes an attachment member, the at least a portion of the attachment member has a planar body; the attachment member extends longitudinally with the rail and the at least a portion of the attachment member is located over a portion of the truck bed; and the stiffener is located on an underside surface of the cover and located adjacent the attachment member of the longitudinally extending rail.

Another illustrative embodiment of the present disclosure provides a tonneau cover assembly that selectively covers a truck bed of a truck. The tonneau cover assembly comprises a cover and a longitudinally extending rail located adjacent a sidewall of the truck bed. The longitudinally extending rail includes an attachment member. At least a portion of the attachment member has a planar body. The attachment member extends longitudinally along the rail. The at least a portion of the attachment member is inclined with respect to a top surface the sidewall. The cover includes a stiffener located on an underside of the cover and adjacent the attachment member of the longitudinally extending rail.

In the above and other illustrative embodiments, the tonneau cover assembly may further comprise the stiffener having a body that is more rigid than the cover.

Additional features and advantages of the rolling tonneau cover assembly will become apparent to those skilled in the art upon consideration of the following detailed descriptions of carrying out the rolling tonneau cover assembly as presently perceived.

BRIEF DESCRIPTION OF THE DRAWINGS

The concepts described in the present disclosure are illustrated by way of example and not by way of limitation in the accompanying figures. For simplicity, and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Figure 1:
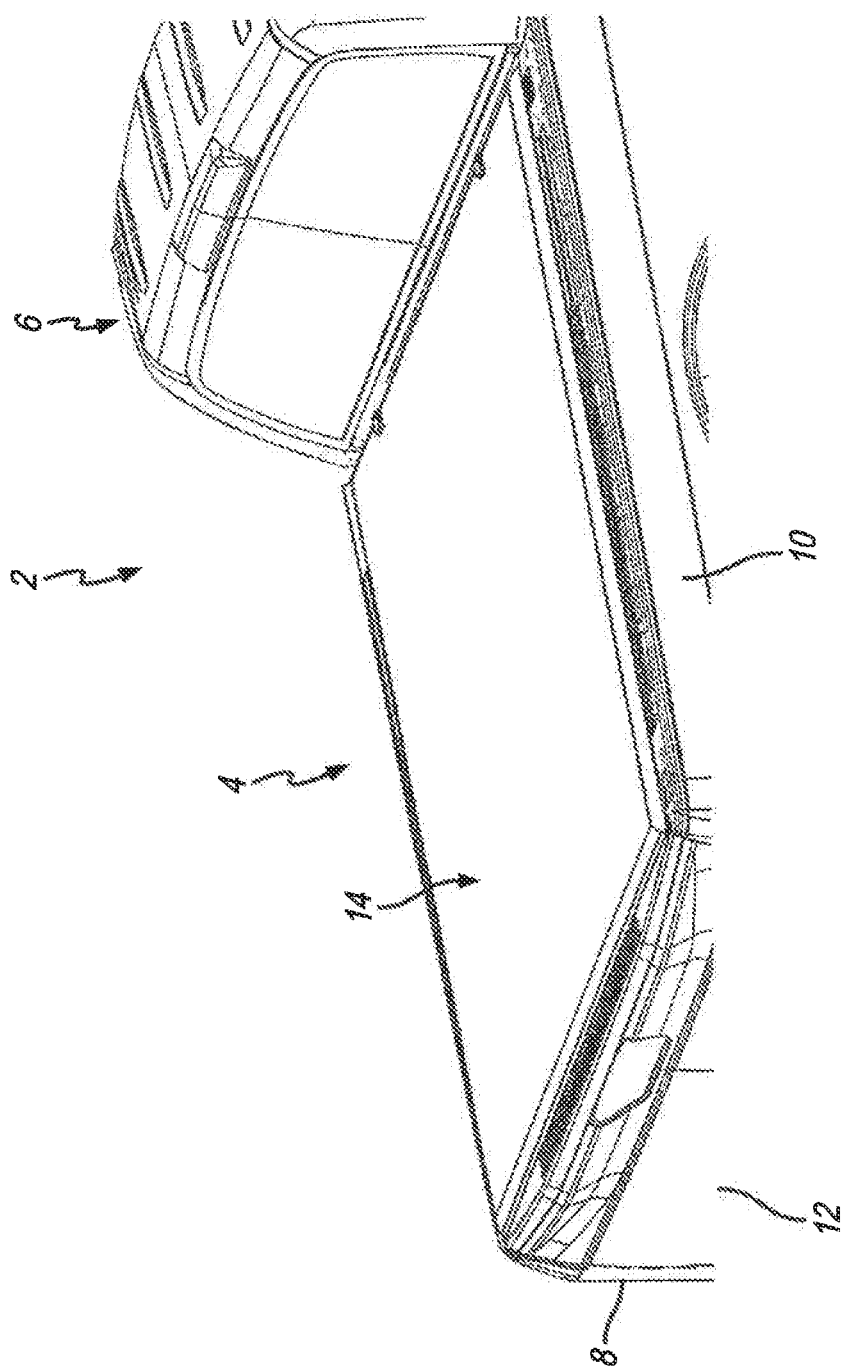
FIG. 1 is a rear perspective view of a portion of a pickup truck including its bed section and a cab section located forward of the bed section, and a tonneau cover covering the bed section.

Corresponding reference characters indicate corresponding parts throughout the several views. The exemplification set out herein illustrates embodiments of the rolling tonneau cover assembly, and such exemplification is not to be construed as limiting the scope of the rolling tonneau cover assembly in any manner.

DETAILED DESCRIPTION OF THE DRAWINGS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

An illustrative embodiment of the present disclosure provides a tonneau cover that can be rolled and unrolled over the truck bed. Rails, one on each side of the truck bed, attach to the sidewalls to provide a fastening surface for the cover. By employing engaging panels of a hook and loop fastener (otherwise known as VELCRO®) installed longitudinally along each rail and edge of the rollable cover, accessibility or restriction to or from the truck bed may be provided. Because the cover is flexible, the VELCRO® hook and loop fastener on the rail and cover, respectively, may be separated. The cover may then be rolled up to allow access to the truck's bed underneath. Conversely, the cover may be unrolled with the panels of the VELCRO® hook and loop fastener engaging each other to secure the cover onto the rails. Because the rails line the sidewalls of the truck bed, it will be shrouded by the cover. It is appreciated that such roll-up covers of the present disclosure may be made of vinyl, other flexible polymer, fabric, or other like durable flexible sheet.

Another embodiment of the present disclosure provides railing systems for attachment to the upward-extending sidewalls of the truck bed. These railing systems are configured to receive end portions of the rolled-up cover. Illustratively, the rails have cross sectional profiles that assist in improving the securement between the hook and loop fastener of the rail and cover.

Another illustrative embodiment of the present disclosure provides a latching system that also assists in securing an end of the roll-up cover to the rails. Furthermore, the latch system is fully accessible with the tailgate unlatched and pivoted downward toward the open position. This offers a level of security that inhibits the cover from being rolled up without accessing the latching system underneath.

Another illustrative embodiment of the present disclosure provides a tensioning system that allows adjustment of the roll-up cover from front to back when in its unrolled position covering the truck's bed. The cover may be tensioned as needed to help create a planar surface over the truck's bed. This, among other aspects, allows water to shed from the top surface of the roll-up cover instead of pooling because of its accumulated weight remaining on the top surface of the cover.

Roll-Up Cover Rail System

A rear perspective view of a truck or pickup truck 2, with a bed section 4 and a cap section 6 located forward of bed section 4, is shown in FIG. 1. Upward extending sidewalls 8 and 10, with tailgate 12 extending therebetween as shown, form the side and rear bounds of bed section 4 of truck 2. Extending across upward extending sidewalls 8 and 10 is roll-up cover 14. As illustrated, roll-up cover 14, is shown in its unrolled condition covering bed section 4. As also shown, roll-up cover 14 shrouds the interior of bed section 4.

Figure 2:
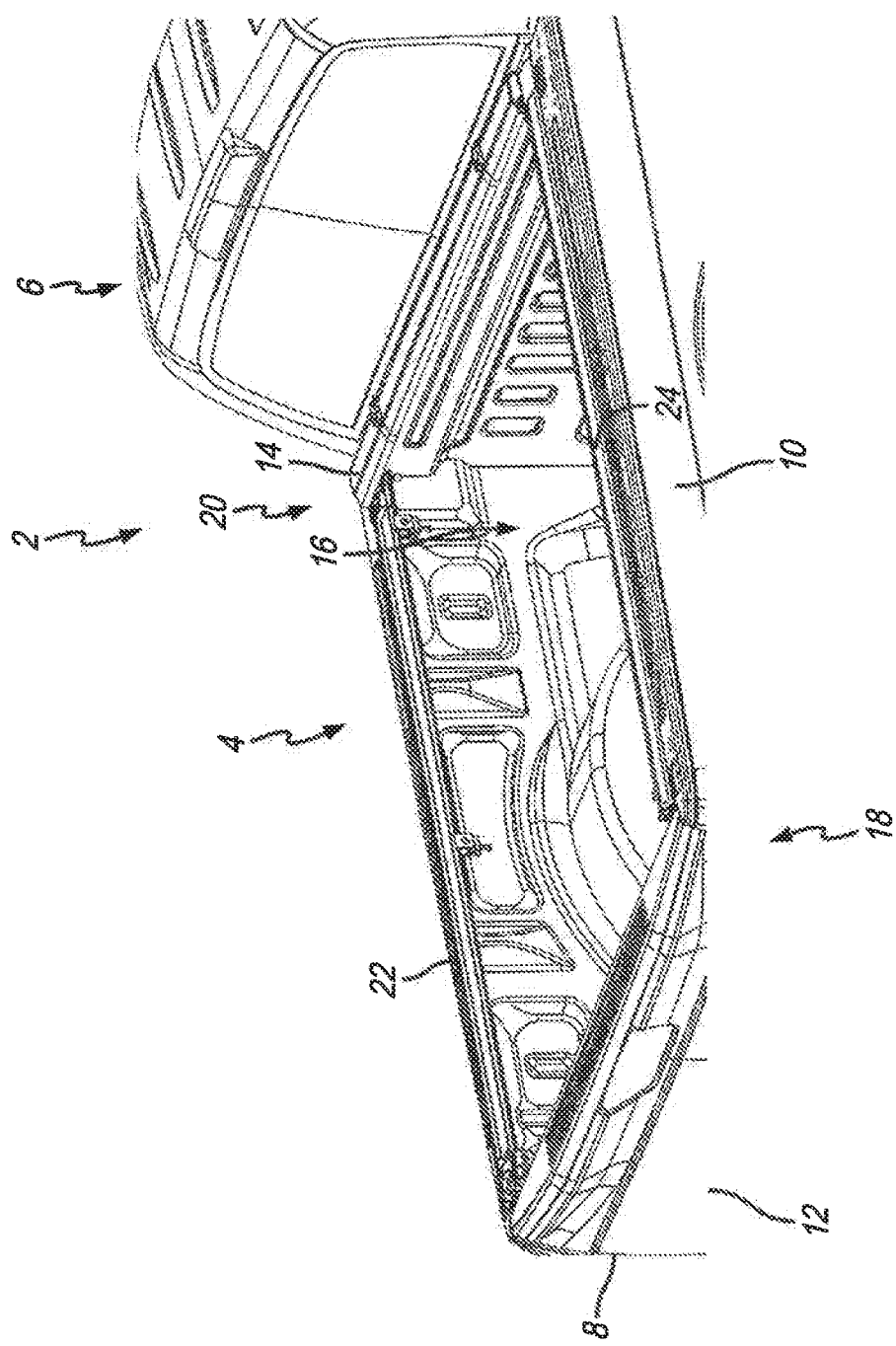
FIG. 2 is a similar rear perspective view of the pickup truck of FIG. 1 showing the tonneau cover in its stowed condition uncovering the bed section.

A similar rear perspective view of pickup truck 2 is shown in FIG. 2. Again, bed section 4 is depicted positioned rear of cab section 6. In this view, however, interior 16 of bed section 4 is shown because roll-up cover 14 has been rolled up illustratively from rear section 18 to forward section 20. Thus, the general operation of roll-up cover 14 is appreciated by comparing the views of FIGS. 1 and 2. Further shown in FIG. 2 are rails 22 and 24. Illustratively, rail 22 is located on upward extending sidewall 8 while rail 24 is positioned atop upward extending sidewall 10. As further disclosed herein, a portion of a hook and loop fastener extends along each rail and engages the corresponding portion of the hook and loop fastener on the underside of roll-up cover 14 to secure same over bed section 4 (see FIGS. 4 and 5).

Figure 3:
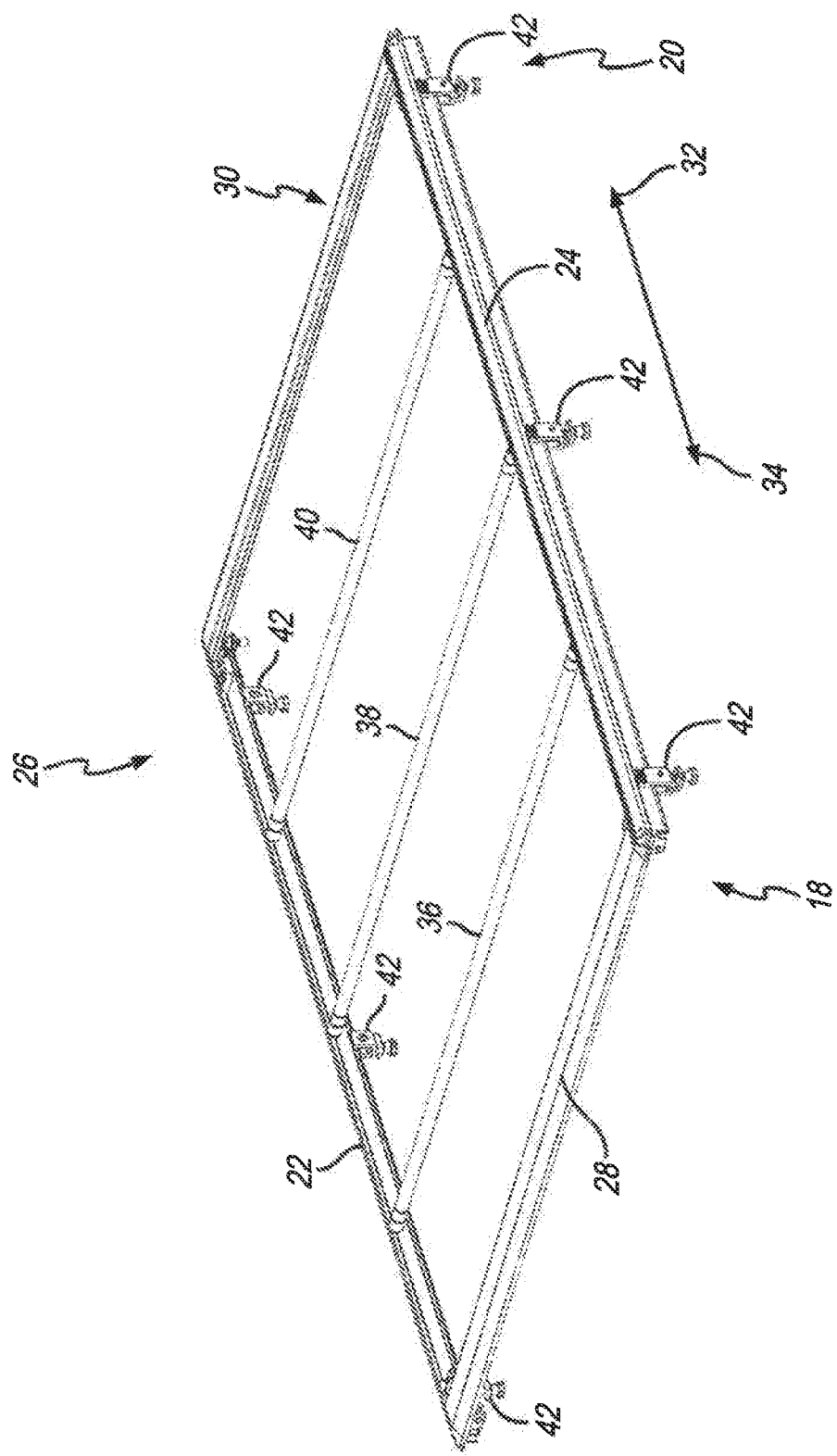
FIG. 3 is an isolated perspective view of a rail assembly and tonneau cover bars for the tonneau cover.

A perspective isolated view of rail assembly 26, which includes rails 22 and 24, are shown in FIG. 3. In addition to rails 22 and 24, rail assembly 26 includes end plate assembly 28 extending between rails 22 and 24 at, illustratively, rear section 18 of same. Located opposite end plate assembly 28, but also between rails 22 and 24, is tensioning assembly 30, illustratively, at forward section 20 of rail assembly 26. In the illustrative embodiment, end plate assembly 28 is configured to unlatch from rails 22 and 24 and unroll along their longitudinal extent in directions 32 and 34. Roll-up cover 14, thus, selectively uncovers and covers bed section 4.

Also shown herein are rafter bars 36, 38, and 40 which extend from rail 22 to rail 24 suspended over bed section 4 (see, also FIG. 2). Rafter bars 36, 38, and 40 are stiffening members extending along the open span of bed section 4 to assist roll-up cover 14 in maintaining a relatively flat surface. Because water or other material may be able to accumulate on the top surface of roll-up cover 14, rafter bars 36, 38, and 40 provide support to help maintain an otherwise flexible surface to be generally flat. This helps shed the water or other material off of roll-up cover 14. Indeed, rafter bars 36, 38, and 40 may be bowed in a convex manner (not shown) to provide some degree of pitch to roll-up cover 14 when in the unrolled and bed covering position. This further assists shedding water or other material from the top surface of roll-up cover 14. This view also includes a plurality of clamps 42 periodically positioned along each of rails 22 and 24. Clamps 42 assist in providing the securement for rails 22 and 24 onto corresponding upward extending sidewalls 8 and 10. Because, typically, such bed covers are not integrally built into the truck bed sidewalls, the rails to support the covers are added as an after-market accessory.

Figure 4:
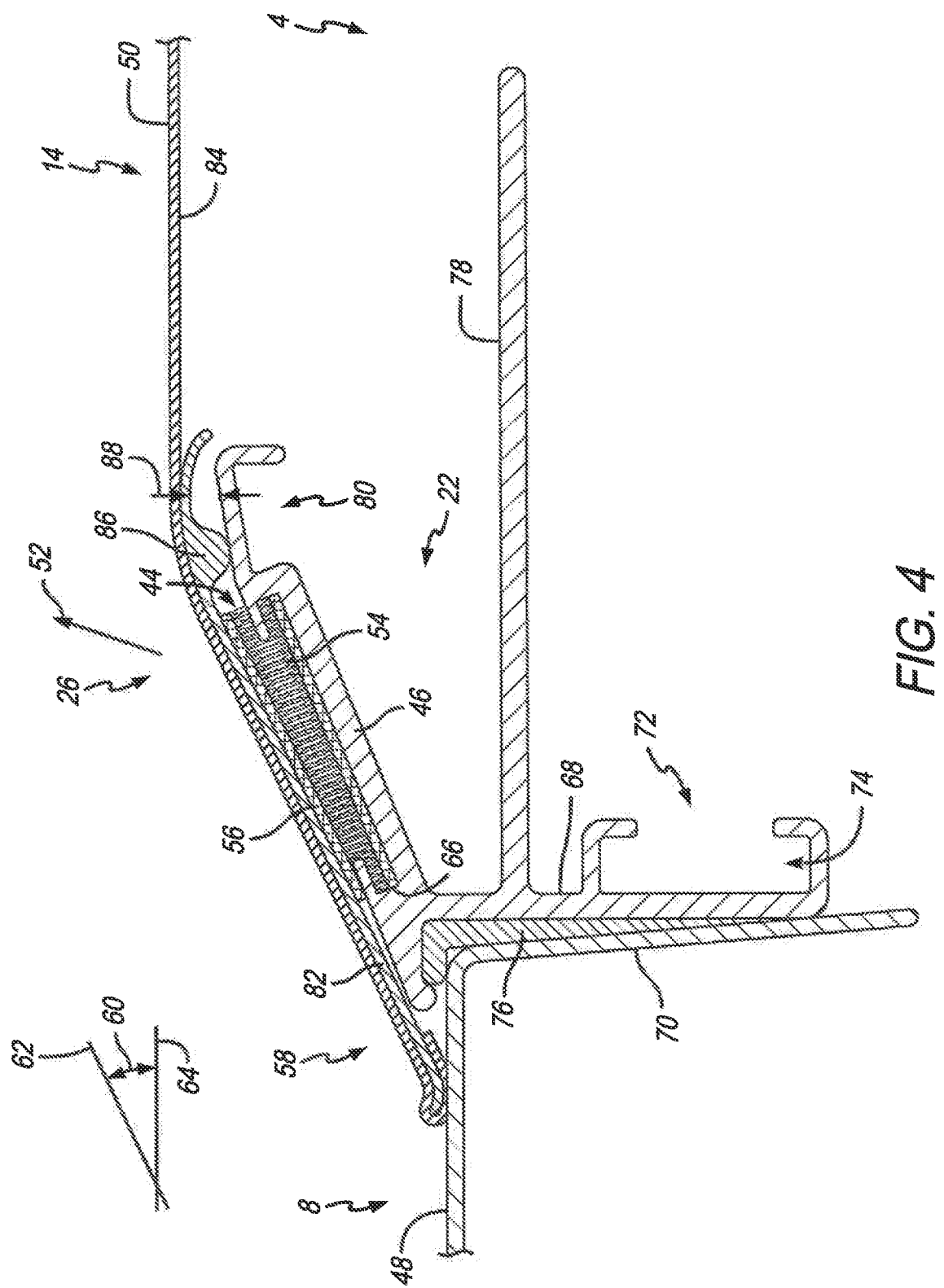
FIG. 4 is a cross-sectional profile view of a portion of the rail assembly.

A cross sectional profile view of a portion of rail assembly 26, with roll-up cover 14 attached thereon, is shown in FIG. 4. Particularly, this view shows rail 22 attached to upward extending sidewall 8, with roll-up cover 14 attached to rail 22, via hook and loop fastener 44. It is to be appreciated by the skilled artisan upon reading this disclosure that the descriptions herein with regard to the cross section of rail 22 and associated structures, will be substantially the same (with some structures in mirror image) with regard to rail 24 on the opposed upward extending sidewall 10. Rail 24, thus, includes roll-up cover 14 attached thereto via hook and loop fastener 44 as well. Accordingly, the descriptions herein with respect to the interaction between rail 22 and roll-up cover 14 apply to rail 24 and roll-up cover 14 as well.

As shown herein, rail 22 includes an attachment member 46 which extends over bed section 4 and is inclined with respect to the top surface 48 of upward extending sidewall 8. For appearances, it may be preferable to have as low a profile (i.e., as little incline with respect to surface 48) of attachment member 46 as possible. This lack of incline, however, causes a problem when using a hook and loop fastener. A hook and loop fastener, such as hook and loop fastener 44, is essentially a longitudinally extending strip of randomly placed loops on one surface that are configured to engage and secure to a separate panel of longitudinally extending and randomly placed hooks on a second surface (e.g., VELCRO®).

As illustratively shown herein, attachment member 46 includes an attachment slot 66 sized and configured to receive hook panel 54. It will be appreciated by the skilled artisan upon reading this disclosure that attachment slot 66 and hook panel 54 are longitudinally extending in directions 32 and 34 along an extent of rail 22 on attachment member 46. This means, as roll-up cover 14 is being rolled up, loop panel 56, which also extends a length of the underside of roll-up cover 14, will be caused to continuously separate from the longitudinal extent of hook panel 54. Having such a longitudinally extending securement between roll-up cover 14 and rail 22 ensures a secure connection between the two structures. It will also be appreciated that in alternate embodiments, hook panel 54 may be affixed to roll-up cover 14 while loop panel 56 may be affixed to attachment member 46.

As will be further appreciated by the skilled artisan upon reading this disclosure, hook and loop fastener 44 may not present optimum holding characteristics if sheer forces such as forces moving in directions 32 or 34 (see FIG. 3) along each of the hook and loop panels. In other words, the hooks do not securely engage the loops on VELCRO® fasteners when forces are being applied laterally with respect to the placement of the VELCRO® components. Such hook and loop fasteners are believed to only have a limited amount of holding strength. In order to hold the correct amount of tension on cover attachment member 46, it is angled upward as shown and roll-up cover 14 bends around rail 22. Bending around rail 22 creates a reactionary normal force at the contact point producing a friction force between roll-up cover 14 and rail 22. For demonstrative purposes, angled line segments 62 and 64 are shown in FIG. 4 as well. Illustratively, securement portion 58 of roll-up cover 14 is oriented at an angle 60 represented by line 62 from horizontal line 64, which is generally parallel to the orientation of top surface 50 of roll-up cover 14. This aids hook and loop fastener 44 to allow securement portion 58, as a whole, to hold a greater amount of tension on roll-up cover 14. The steeper the angle (e.g., 60 or 96 from FIGS. 4 and 5, respectively), the greater this effect is.

As a further aid to create a tensioned engagement between hook panel 54 and loop panel 56, side cover stiffener 82 is attached to underside surface 84 of roll-up cover 14 as shown. In the illustrative embodiment, loop panel 56 may be attached to side cover stiffener 82. Illustratively, side cover stiffener 82 may be made of an extruded rubber, thermoplastic elastomer (TPE), or other rubber and like materials.

Also part of side cover stiffener 82, on roll-up cover 14, is a downward depending rib 86. It is appreciated that side cover stiffener 82, with rib 86, extends longitudinally along securement portion 58 of roll-up cover 14 in directions 32 and 34. Rib 86 is configured to provide additional space between roll-up cover 14 and attachment member 46 by being supported at downward depending surface member 80. Separation 88, that is produced, assists in creating further tension between hook panel 54 and loop panel 56 in general direction 52. Rib 86 helps to create a sharper corner, which produces a greater friction force than a similar cover without the rib at a given rail angle. Without a steeper angle or rib, the pull force direction on the hook and loop fastener is believed to change so it will have a greater component that is perpendicular to the face of the hook and loop fastener. Hence, as shown in FIG. 4, attachment member 46 is positioned at a transverse angle with respect to surface 48 of sidewall 8 and top surface 50 of roll-up cover 14. Because much of top surface 50 of roll-up cover 14 is oriented generally parallel to top surface 48 of sidewall 8 (or generally horizontal with the ground), having hook and loop fastener 44 oriented at some transverse angle to the horizontal portion of top surface 50 tends to produce a tension force in generally direction 52. In other words, hook panel 54 and loop panel 56 are better able to secure to each other under such a tension force (i.e., generally in direction 52) rather than sheer force and directions 32 and 34. This provides more secure engagement between these structures and hence securement between roll-up cover 14 and rail 22.

Also part of rail 22 is a downward depending securement bracket 68 as illustratively shown. Securement bracket 68 depends downward from attachment member 46 to be located adjacent wall portion 70 of upward extending sidewall 8. A clamp bracket 72 forms an illustrative channel slot 74 that is sized to receive a portion of clamp 42 so as to secure securement bracket 68 to wall portion 70 of upward extending sidewall 8. An illustrative seal 76 may be positioned between securement bracket 68 and wall portion 70 to fill space in between as shown. This also prevents rattling or other intermittent vibratory contact between rail 22 and upward extending sidewall 8. Also extending laterally from securement bracket 68 is rail ledge 78. Rafter bars 36, 38, and 40 may be supported on rail ledge 78 to support the span of roll-up cover 14. As shown in this illustrative embodiment, rail ledge 78 is generally parallel to horizontal line 64 and a portion of roll-up cover 14 extending between rails 22 and 24. Also shown herein is a generally downward extending surface member 80 that extends from attachment member 46 as illustratively shown. It will be appreciated by the skilled artisan upon reading this disclosure that rail 22 (as well as rail 24) may be formed via aluminum extrusion to create the cross sectional profile as shown in FIGS. 4 and 5.

Figure 5:
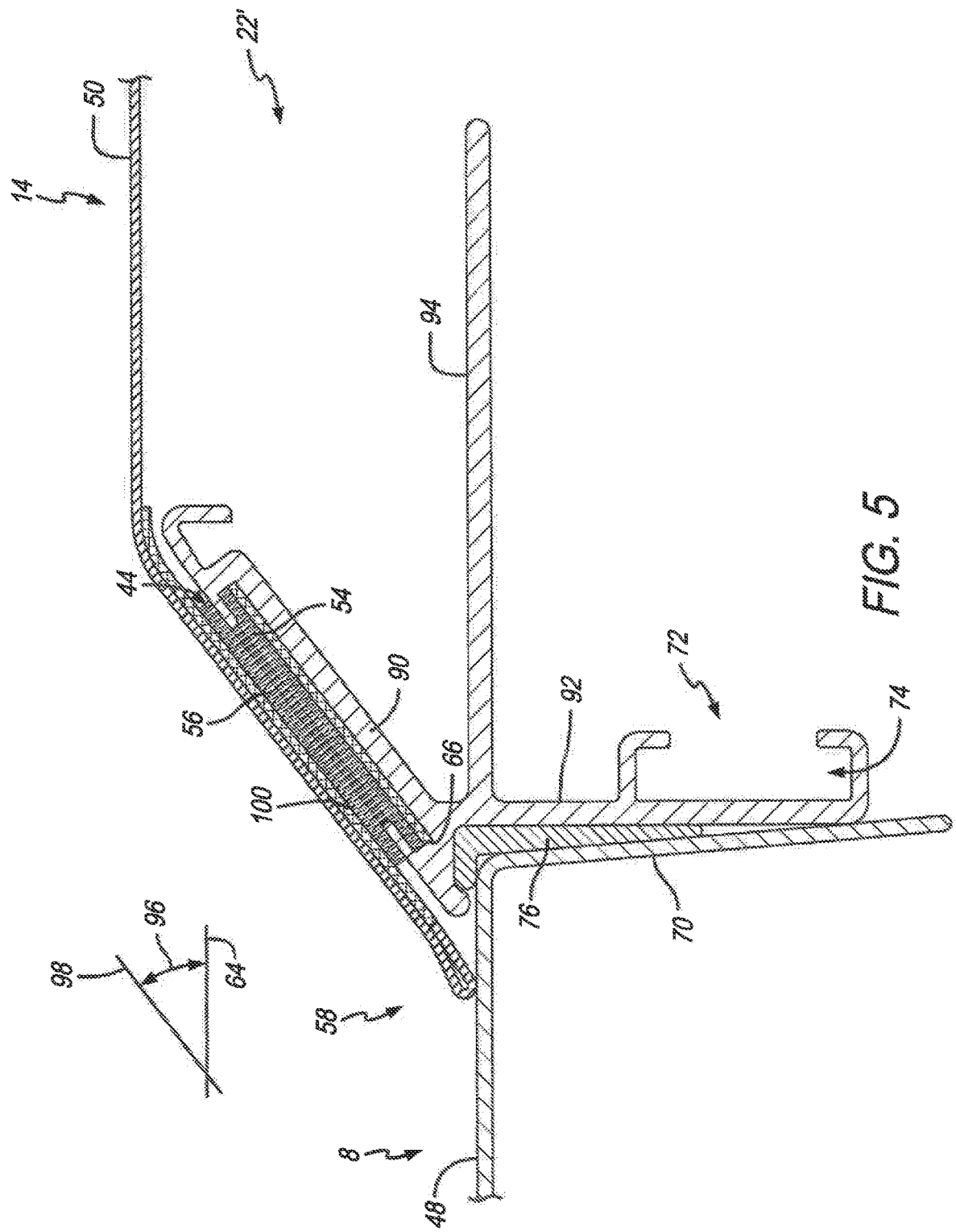
FIG. 5 is a cross-sectional view of another illustrative embodiment of a rail assembly.

Another illustrative embodiment of a rail 22' is shown in FIG. 5. Like the embodiment of rail 22, shown in FIG. 4, rail 22', shown in FIG. 5, includes an attachment member 90 and a securement bracket 92 extending downwardly from attachment member 90. Rail ledge 94 extends from securement bracket 92 as shown (and is similar to rail ledge 78 extending from securement bracket 68). In contrast, attachment member 90 is oriented at a steeper incline with respect to surface 48 of upward extending sidewall 8. As shown in demonstrative line segments in FIG. 5, angle 96, located between horizontal line 64, which is parallel to the span of roll-up cover 14 and line 98, which is parallel to attachment member 90, is steeper (thus, greater) than angle 60 between line 64 and 62 shown in FIG. 4. Orienting attachment member 90, at a steeper incline, is believed to add further securement between hook panel 54 and loop panel 56. This is because the steeper angle inherently creates more tension between hook panel 54 and loop panel 56. As further shown, hook panel 54 sits within attachment slot 66 and is longitudinally extending the same as that described with respect to the rail shown in FIG. 4.

Also, a clamp bracket 72, with clamp slot 74, is formed in securement bracket 92 similar to that shown with securement bracket 68. The same is also the case with seal 76 located between wall portion 70 and securement bracket 92. A stiffener 100 may be formed on securement portion 58 of roll-up cover 14 but does not include any rib to further separate same from attachment member 90. It is also appreciated that loop panel 56 may be longitudinally extending along securement portion 58 and may be attached to stiffener 100. Again, the various structures shown with respect to rail 22' in FIG. 5 operate the same as the structures of rail 22 shown in FIG. 4, except for the steeper angle of attachment member 90 relative to the angle of attachment member 46. Also, all of these structures exist with respect to a rail 24' (not shown) in contrast to rail 24 so both sides of roll-up cover 14 are secured to shroud truck bed 4.

Pinch Latch Assembly

Another illustrative embodiment of the present disclosure is directed to a pinch latch assembly that is part of endplate assembly 28 that permits selective unlatching of endplate assembly 28 so it, as part of rollup cover 14, may be rolled up along rails 22 and 24. As can be appreciated by the view of rail assembly 26 in FIG. 3, endplate assembly 28 does not appear to expose the components of a pinch latch assembly from the topside of same. Concealing the pinch latch assembly underneath endplate assembly 28 makes access to same more difficult when tailgate 12 is in its upright and latched position. Pinch latch assemblies similar to that used in the present disclosure (but not exactly), are disclosed in U.S. Patent Application, Ser. No. 62/577,920 (the "'920 application"), entitled "Folding Cover Attachment Systems," filed on Oct. 27, 2018; U.S. patent application Ser. No. 15/342,407, entitled "Tonneau Cover," filed Nov. 3, 2016; and U.S. patent application Ser. No. 15/454,326, entitled "Tonneau Cover With Prop Rod Assembly," filed Mar. 9, 2017. The disclosure of all of these Applications, as well as their priority documents, are incorporated herein by reference in their entirety.

Figure 6:
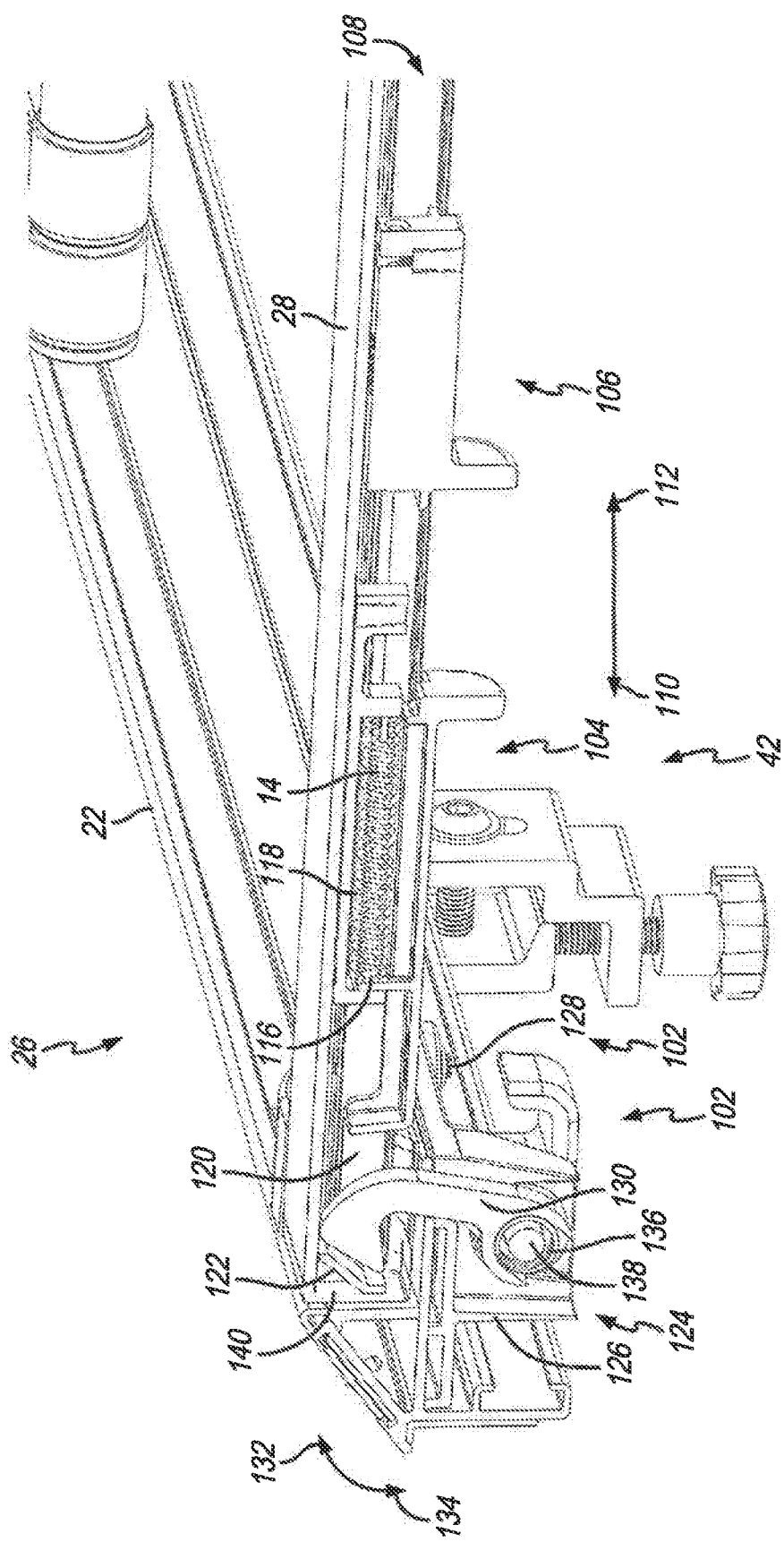
FIG. 6 is a perspective sectional detail view of a portion of the rail and endplate assemblies of the tonneau cover.

A perspective longitudinally extending sectional detail view of a portion of frame rail assembly 26 is shown in FIG. 6. This view depicts rail 22 secured to endplate assembly 28 via latching assembly 102. Here, latching assembly 102 includes latch handle portion 104 and inner latch handle portion 106, all located within guide track 108 formed on the underside of endplate assembly 28. Latch handle portion 104 and inner latch portion 106 are configured to move in directions 110 and 112. Indeed, the structures related to latching assembly 102, latch handle 104, and inner latch 106, operate substantially similar to the pinch latch assembly disclosed in the '920 application at FIGS. 3A, 3B, 4A-4C, 5, 6A, 6B, 7, 8, 9A-9D, and 10, for example. As shown in FIG. 6 of the present disclosure, a spring 114 is located in channel 116 of latch handle portion 104. Spring 114 is held in place via latch base 118. That may be secured within guide track 108 similar to that shown in FIGS. 5, 6A-6B, 7, and 8 of the '920 application incorporated herein by reference. A distinction, however, between operation of latching assembly 102 in the present disclosure and pinch latch assembly 18 in the '920 application is that there is no latch (such as latch 27 in the '920 application) or latching function that is on or part of latch handle portion 104. Instead, an extending member 120 extends from latch handle portion 104 within guide track 108. A depending draw tab 122 extends from extending member 120.

A pivoting latch member assembly 124 is attached to a portion of rail 22 and is configured to be moved by actuation of latch handle portion 104. With respect to pivoting latch member assembly 124, it includes an attachment bracket 126 sized and configured to fasten to rail 22 via faster 128 and pivotally support latch member 130. Latch member 130 is pivotable in directions 132 and 134 with respect to rail 22 and employed end plate assembly 28. An illustrative spring 136 wraps around pivot pin 138 to create a bias force on latch member 130 in direction 134. This being the case, latch member 130 biases towards depending draw tab 122. Also shown in this view is hook member 140 located adjacent depending draw tab 122 and is configured, as illustratively shown, to engage latch member 130. Because hook member 140 is attached to endplate assembly 28, when latch member 130 engages hook member 140, endplate assembly 28 is prevented from lifting off of rail 22. This secures endplate assembly 28 to rail 22. Lastly, shown herein is clamp 42 configured to engage rail 22 to attach same to an upward extending sidewall of pickup truck 2. It will be appreciated by the skilled artisan upon reading this disclosure that the descriptions related herein to latching assembly 102 on endplate assembly 28 and securing same to rail 22, have corresponding components adjacent to opposed rail 24 to secure endplate assembly 28 to rail 24 as well.

Figure 7:
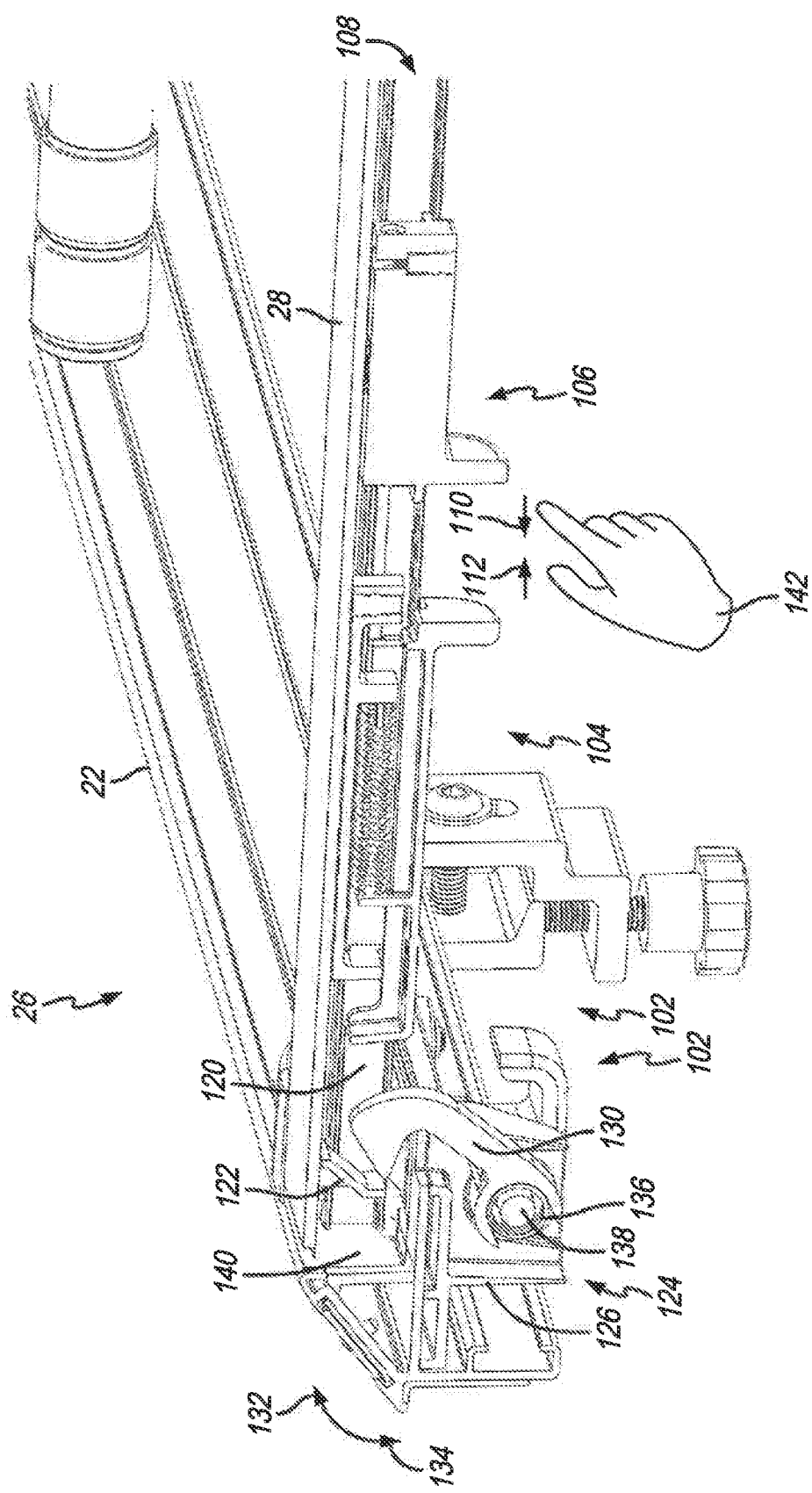
FIG. 7 is another perspective sectional detail view of a portion of the rail and endplate assemblies of FIG. 6.

Another perspective detail view of rail assembly 26, including rail 22 and endplate assembly 28, are shown in FIG. 7. This view is essentially the same as that shown in FIG. 6 except here latching assembly 102 is shown unlatching endplate assembly 28 from rail 22. In this illustrative embodiment, a hand 142 draws latch handle portion 104 and inner latch handle portion 106 together in directions 112 and 110, respectively, as shown. This causes latch handle portion 104 to move extending member 120 within guide track 108 in direction 112. This draws depending draw tab in direction 112 as well. As shown, depending draw tab 122 engages latch member 130 pivoting same in direction 132 against the bias force of spring 136 and about pivot pin 138. This has the effect of pulling latch member 130 away from hook member 140 on endplate assembly 28. By decoupling these two structures, endplate assembly 28 is no longer secured to rail 22.

Figure 8:
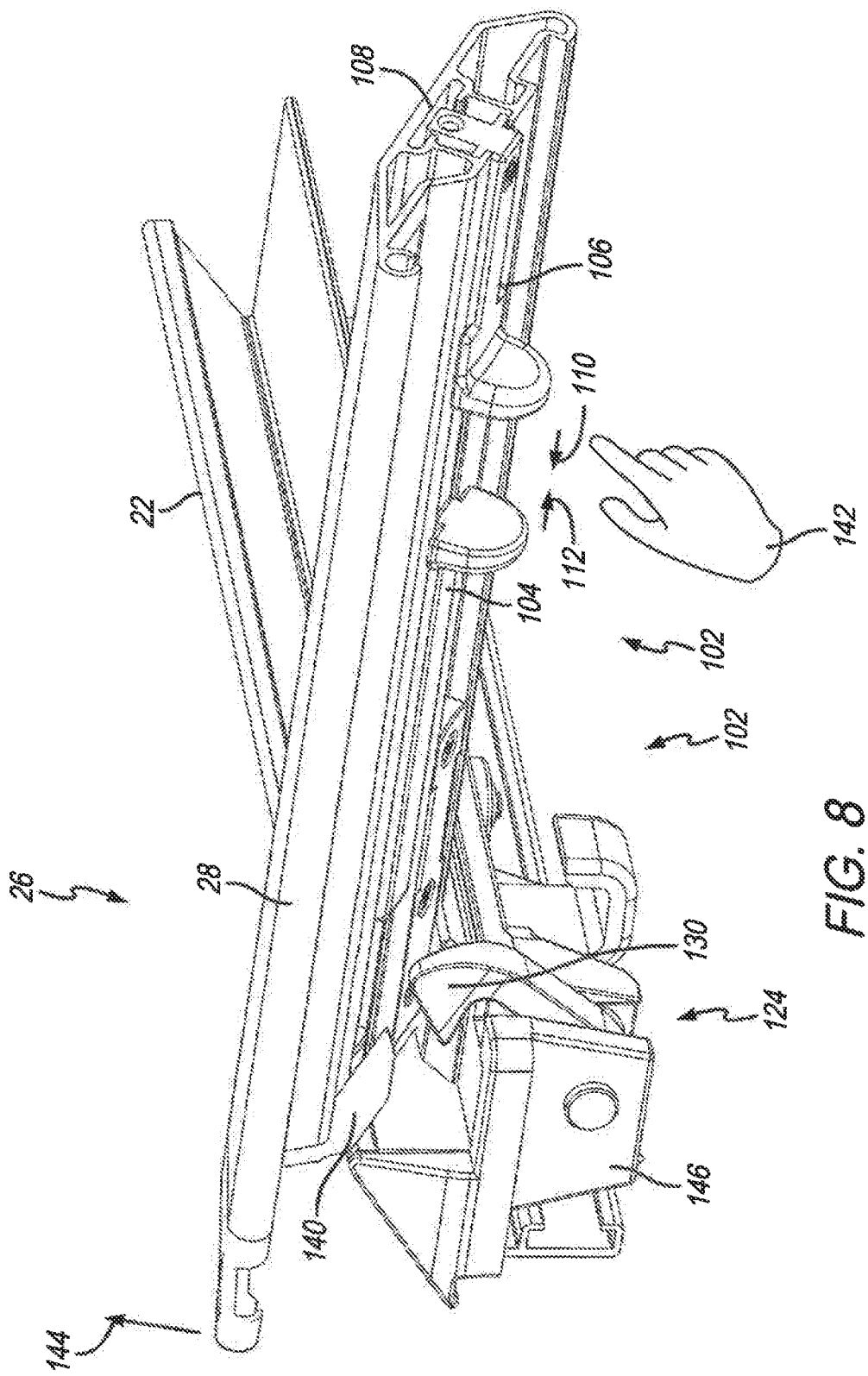
FIG. 8 is a perspective detail view of the rail and endplate assemblies.

Another perspective detail view of rail assembly 26 is shown in FIG. 8. This view depicts a progression from latch member 130 secured onto hook member 140 in FIG. 6 to latch member 130 being drawn back in direction 132 (see, also, FIG. 6) by actuation of latch handle portion 104 and inner latch portion 106 being drawn together as shown in FIG. 7. Now, with latch member 130 released from hook member 140, endplate assembly 28 may be lifted in direction 144 so as to be able to roll up with roll-up cover 14 (not shown in this view). This view further shows the underside of endplate assembly 28 where latch handle portion 104 and inner latch handle portion 106 are fitted within guide track 108. Hook member 140 illustratively extends over guide track 108. While attached, latch member 130 fits within guide track 108 and is engageable with hook member 140. Illustratively, a cover member 146 may attach to pivoting latch member assembly 124 to shroud spring 136, and pivot pin 138 (see, also, FIG. 7).

A feature of latching assembly 102 is similar to that shown in FIGS. 4A, 4B, and 4C in the '920 application incorporated herein by reference. Particularly, it is appreciated that both sides of endplate assembly 28 include a latching assembly 102. This is so endplate assembly 28 may be latched to both rails 22 and 24 at the same time. That said, it would be convenient when operating one latching assembly that it will unlatch not only its adjacent latch member, but the other latch member that is pivotably attached to the other nonadjacent rail as well.

Figure 9A:
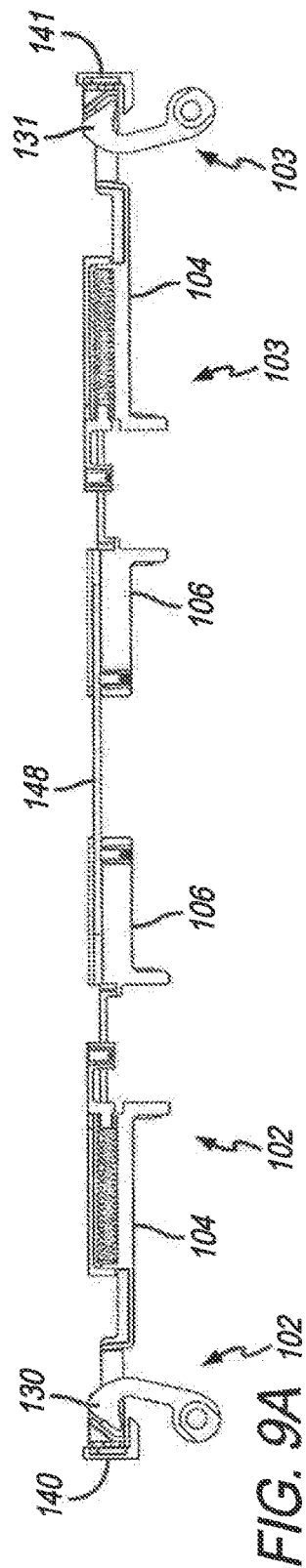
FIGS. 9A, 9B, and 9C are isolated detail views of portions of a latching assembly portion of the tonneau cover, as well the end sectional detail view of a portion of the rail assembly.

For instance, as shown in FIG. 9A, latching assembly 102 is configured to be in engagement with latch member 130 which is secured or pivotably attached to rail 22 (see, also, FIG. 8). On the other side is a latching assembly 103 which includes the same structures oriented in mirror-image to that of latching assembly 102, but here are configured to engage latch member 131 which will be pivotably attached to rail 24 (see, also, FIG. 3). As disclosed in the latch assemblies of the incorporated Applications, including the '920 application, adjacent pitch latch assemblies are connected together so that when one pinch latch assembly is actuated by a hand to move its latch, the other pinch latch assembly is connected thereto, and configured to move therewith to move its latch member as well. Hence, as shown in FIG. 9A, a connector 148 is connected to both inner latch handle portion 106 of latching assemblies 102 and 103, respectively.

Figure 9B:
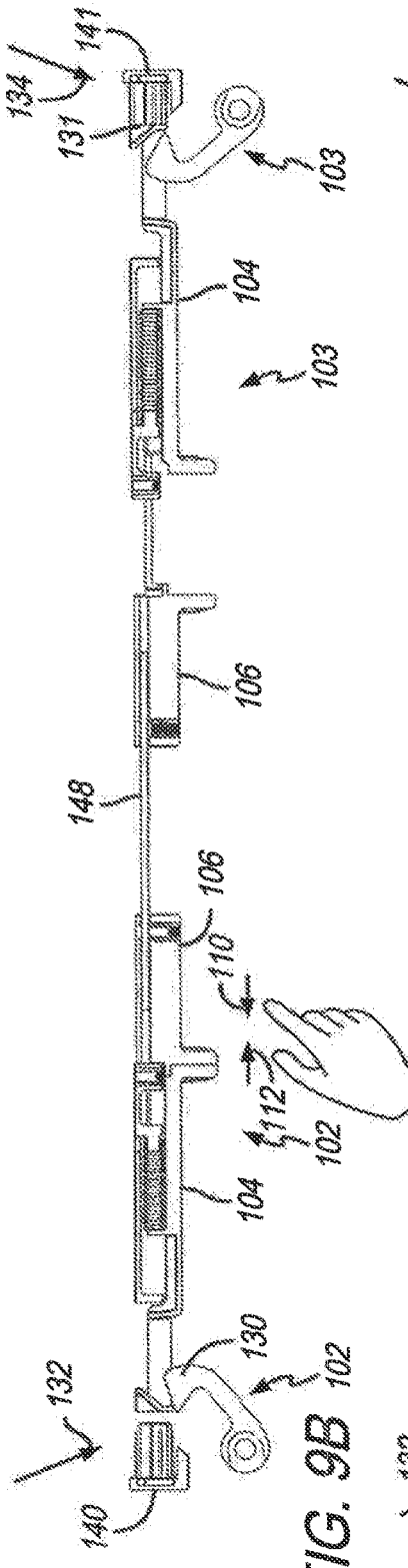
Figure 9C:
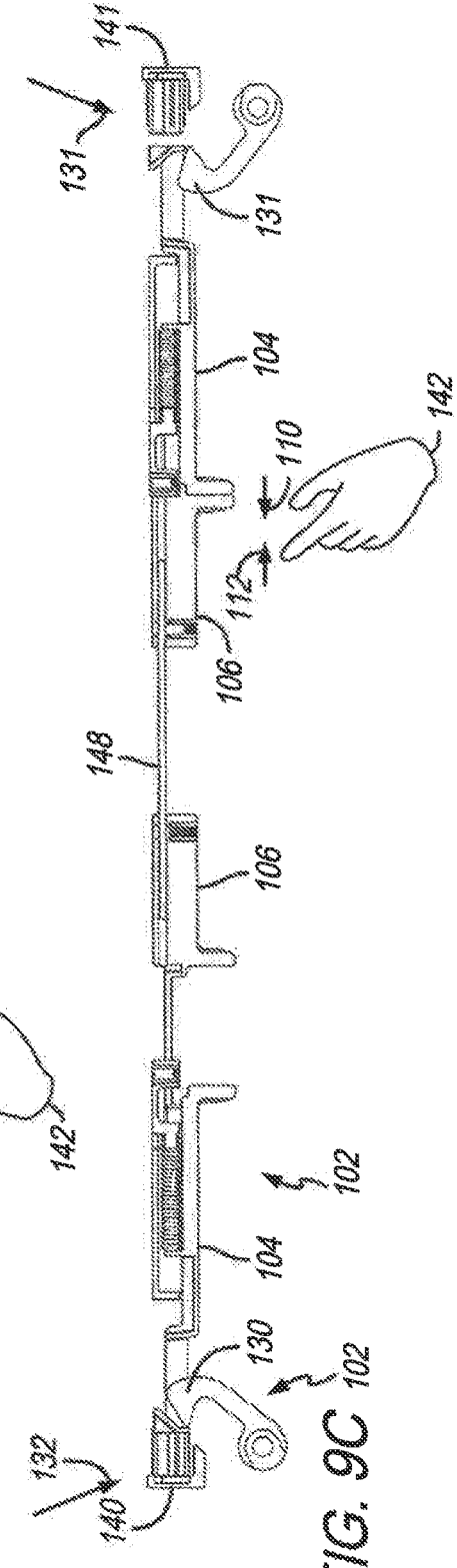

As shown in FIG. 9B, when hand 142 actuates latch handle portion 104 and inner latch handle portion 106 together in directions 112 and 110, respectively, latch member 130 is pivoted away and thus released from hook member 140. At the same time, and because of the same structures as that described in the incorporated Applications, including the '920 application, connector 148 moves in direction 110 as well, which pulls latch handle portion 106 in direction 110, which pulls latch member 131 away from hook member 141 as shown. This frees endplate assembly 28 from both rails 22 and 24 (see, also, FIG. 8).

The same is the case when hand 142 engages latch handle portion 104 and inner latch handle portion 106 of latching assembly 103. By moving latch handle portion 104 and inner latch handle portion 106 in directions 110 and 112, respectively, as shown, latch member 131 is drawn from hook number 141. At the same time, connector 148 draws inner latch handle portion 106 of latching assembly 102 in direction 112 as well. This draws latch handle portion 104 of latching assembly 102 in direction 112 via the same means as that disclosed in the pinch latch handle assemblies of the incorporated Applications. In this embodiment, however, this movement causes latch member 130 to disengage from hook member 140 even though latch handle and inner latch handle portions 104 and 106, respectively, of latching assembly 102, were not moved by hand 142.

Front End Cap and Tension Assembly

Figure 10:
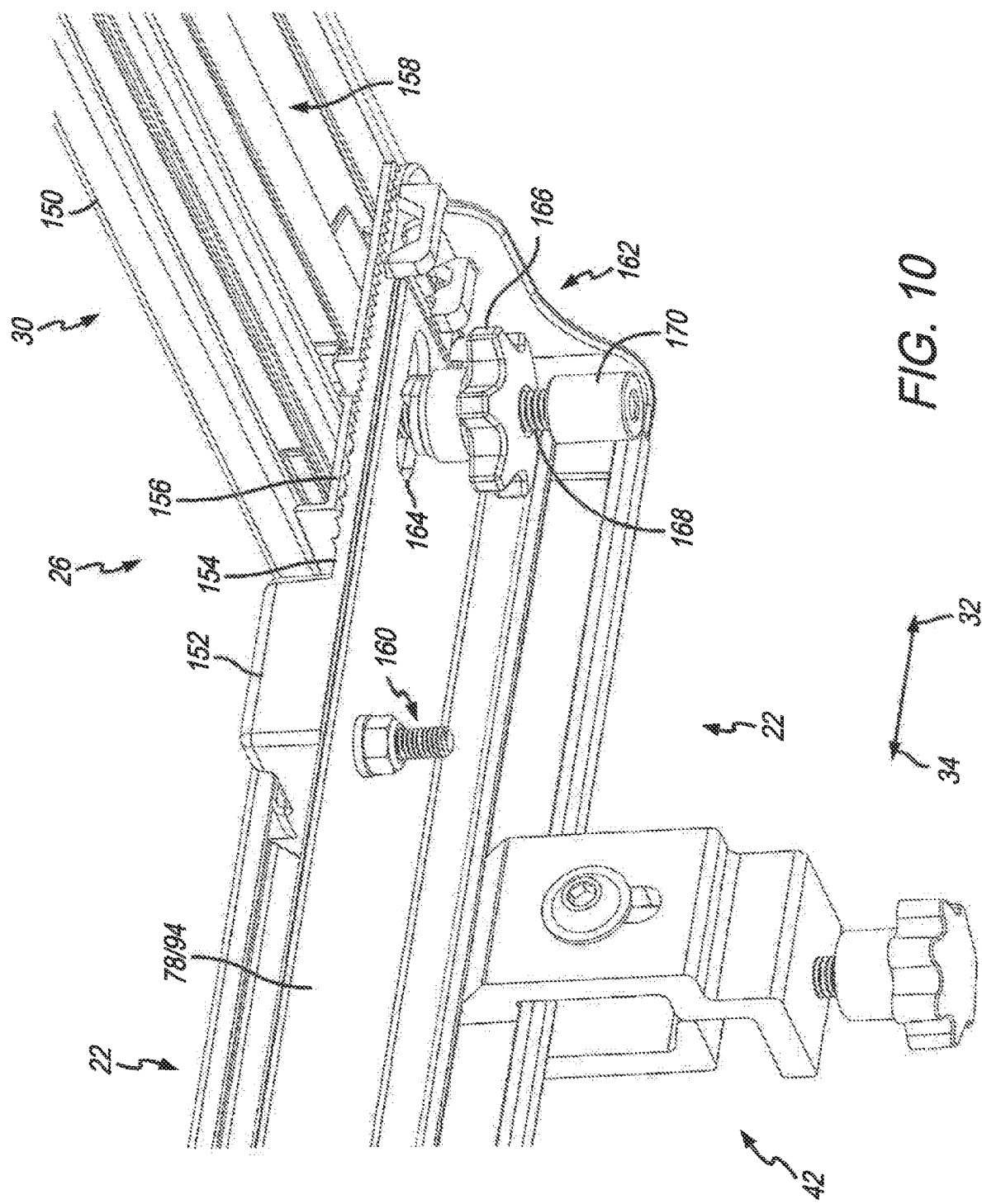
FIG. 10 is an underside detail view of the tonneau cover and rail, and including a tensioning assembly.

Another illustrative view of the present disclosure provides a front end cap and tension assembly. As originally shown in FIG. 3, rail assembly 26 not only includes an endplate assembly 28, but also a tensioning assembly 30 that is illustratively configured to assist in stretching roll-up cover 14 to ensure it is as taut as possible when covering bed section 4. A perspective underside detail view of portions of rail assembly 26 is shown in FIG. 10. Here, a portion of rail 22 is shown engaged with tension bar 150 of tensioning assembly 30. It is contemplated that tension bar 150 will be movable in directions 32 and 34 sufficient to pull roll-up cover 14 taut. Again, as noted previously, it is beneficial that despite roll-up cover 14 being a flexible cover material, it should remain as flat as possible or even bowed upward while covering bed section 4 so as to minimize the potential for water or other material accumulating thereon.

As depicted in FIG. 10, tension bar 150 engages a rail bracket 152 located on rail ledge 78 (or 94, depending on the rail profile (see, also, FIGS. 5 and 6)). Rail bracket 152 includes toothed surface 154 which is composed of a series of angled teeth configured to engage a corresponding toothed surface 156 located on underside 158 of tension bar 150. Rail bracket 152 may be attached to rail ledge 78/94 via fasteners such as the illustrative bolt and nut 160 shown disposed through both rail bracket 152 and rail ledge 78/94 securing same together. Independent of that attachment is tensioning bolt assembly 162, which is disposed through an opening 164 in rail ledge 78/94 and engaged in the underside 158 of tension bar 150. A tension knob 166 is disposed onto bolt 168 to secure positioning of tension bar 150 with respect to rail bracket 152 (and thus rail 22). A locking nut 170 may be employed to limit the movement of tension knob 166 along bolt 168. It is appreciated that opening 164 is illustratively slot-shaped to allow movement of tensioning bolt assembly 162 in either directions 32 or 34 as needed to create the desired tension on roll-up cover 14. Lastly, clamp 42 is shown engaged with rail 22 in order to secure to sidewall 8 of pickup truck 2. It will be appreciated by the skilled artisan upon reading this disclosure that although the descriptions of tensioning assembly 30 are made with respect to rail 22, the same structures, at least some of which may be oriented in mirror image, are attached to rail 24 in the same manner as attached to rail 22 and serve the same purposes.

Figure 11:
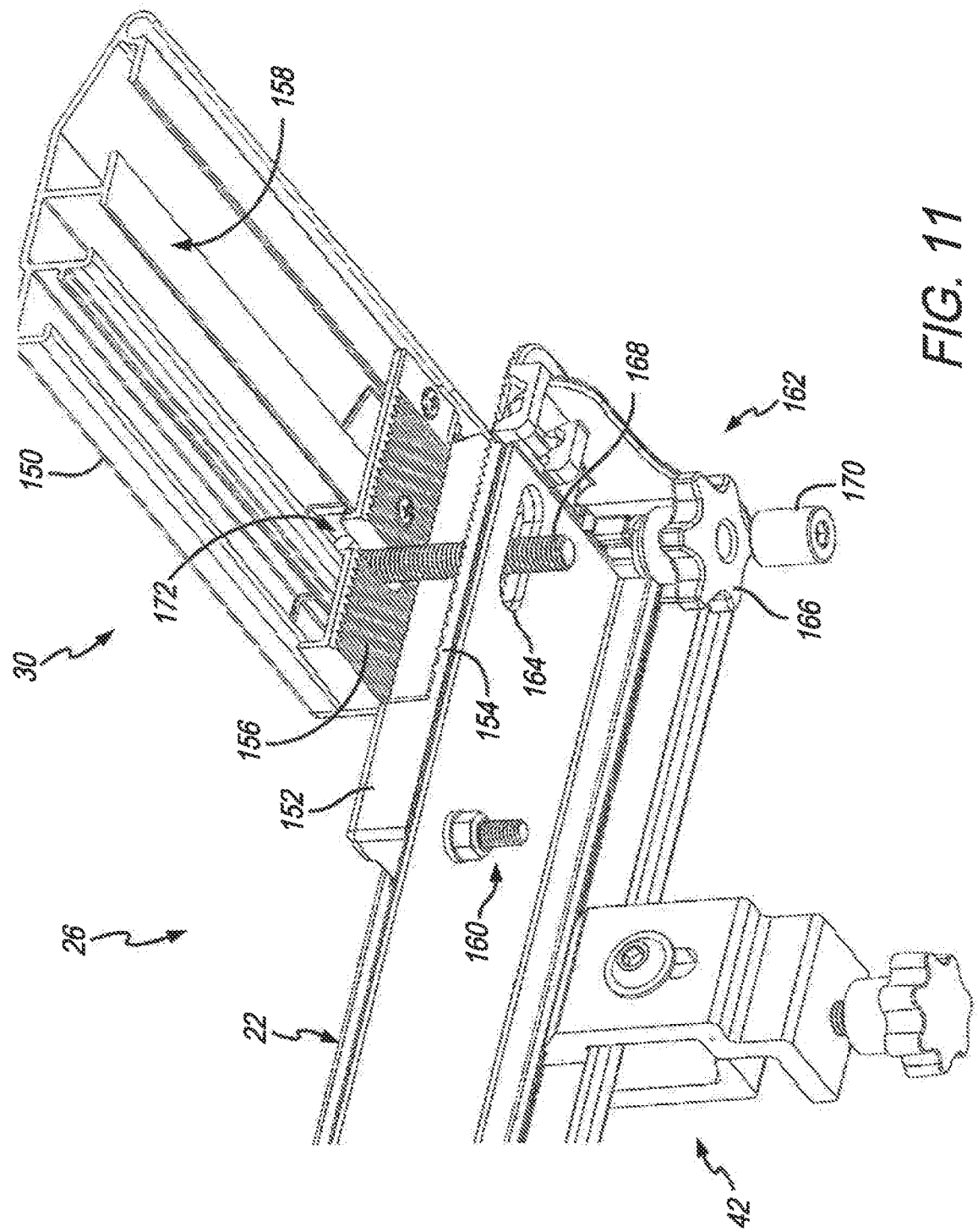
FIG. 11 is an underside perspective and partially exploded detail view of the rail and tensioning assemblies.

An underside perspective and partially exploded detail view of tensioning assembly 30 with respect to rail 22 is shown in FIG. 11. This view further depicts toothed surface 156 on tension bar 150 configured to engage toothed surface 154 on rail bracket 152. It is appreciated from this view how the rows of teeth on toothed surface 156 are tandemly oriented. They are also angled so that once engaged with toothed surface 154, tension bar 150 cannot move in direction 34 toward end plate assembly 28. This may only occur when tensioning bolt assembly 162 is loosened and toothed surface 156 is separated from toothed surface 154. This view further depicts how bolt 168 is disposed within an illustrative slot 172 of toothed surface 156 and disposed through opening 164. Further shown is tension knob 166 and locking nut 170.

Figure 12:
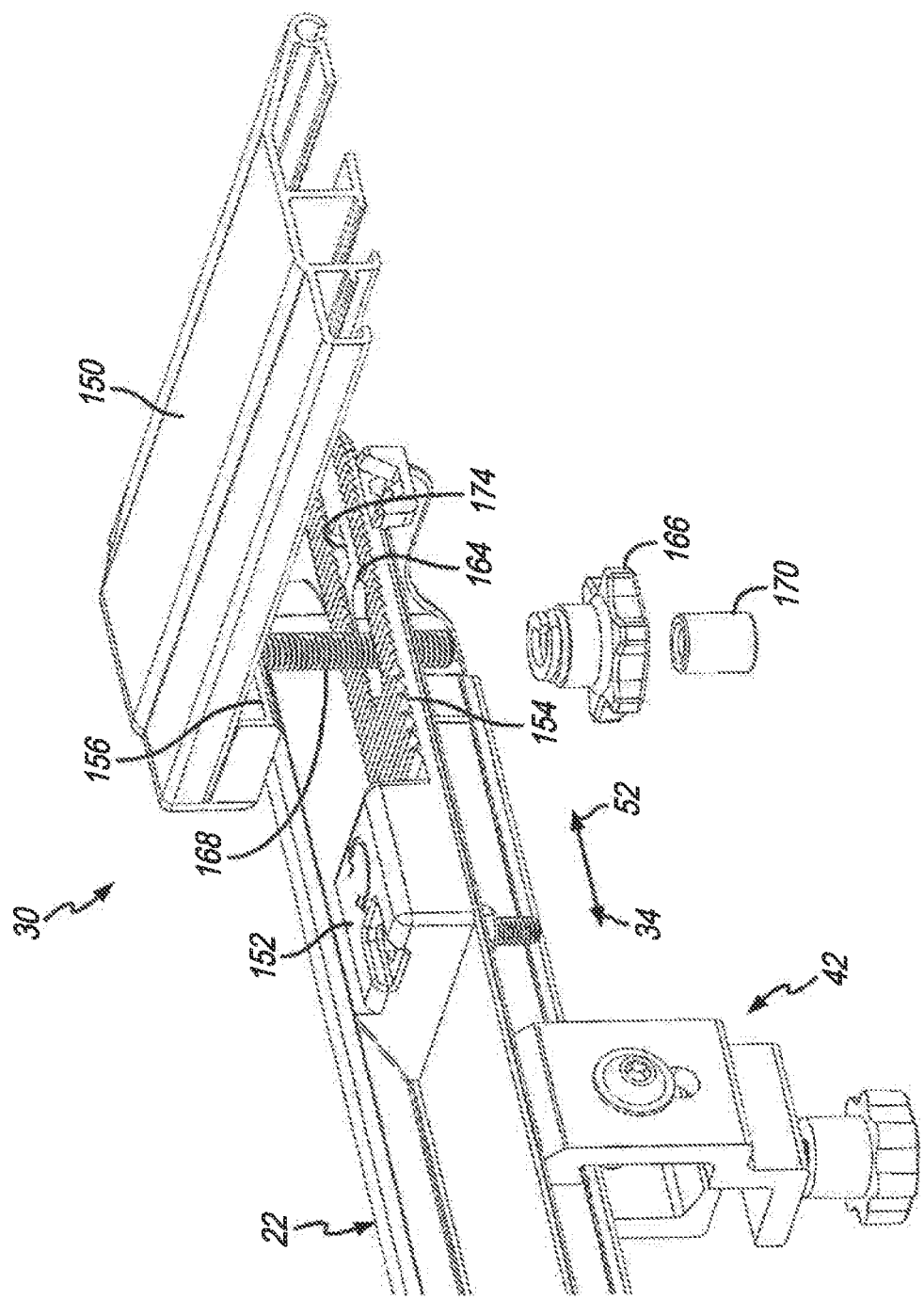
FIG. 12 is a top perspective isolated detail view of a portion of the tensioning assembly and rail.

A top perspective detail view of a portion of tensioning assembly 30 is shown in FIG. 12. In contrast to the view shown in FIG. 11, this view in FIG. 12 illustrates toothed surface 154 of rail bracket 152. This view also depicts the tandem row of teeth that correspond to toothed surface 156 of tension bar 150. Toothed surface 154 includes its own slot 174. This enables tension bar 150, with bolt 168 depending therefrom and extending through opening 164, to be moveable with respect to rail 22 in either direction 32 or 34 so as to create desired placement of roll-up cover 14 and desired tension. Also shown is tensioning knob 166 and locking nut 170.

Figure 13:
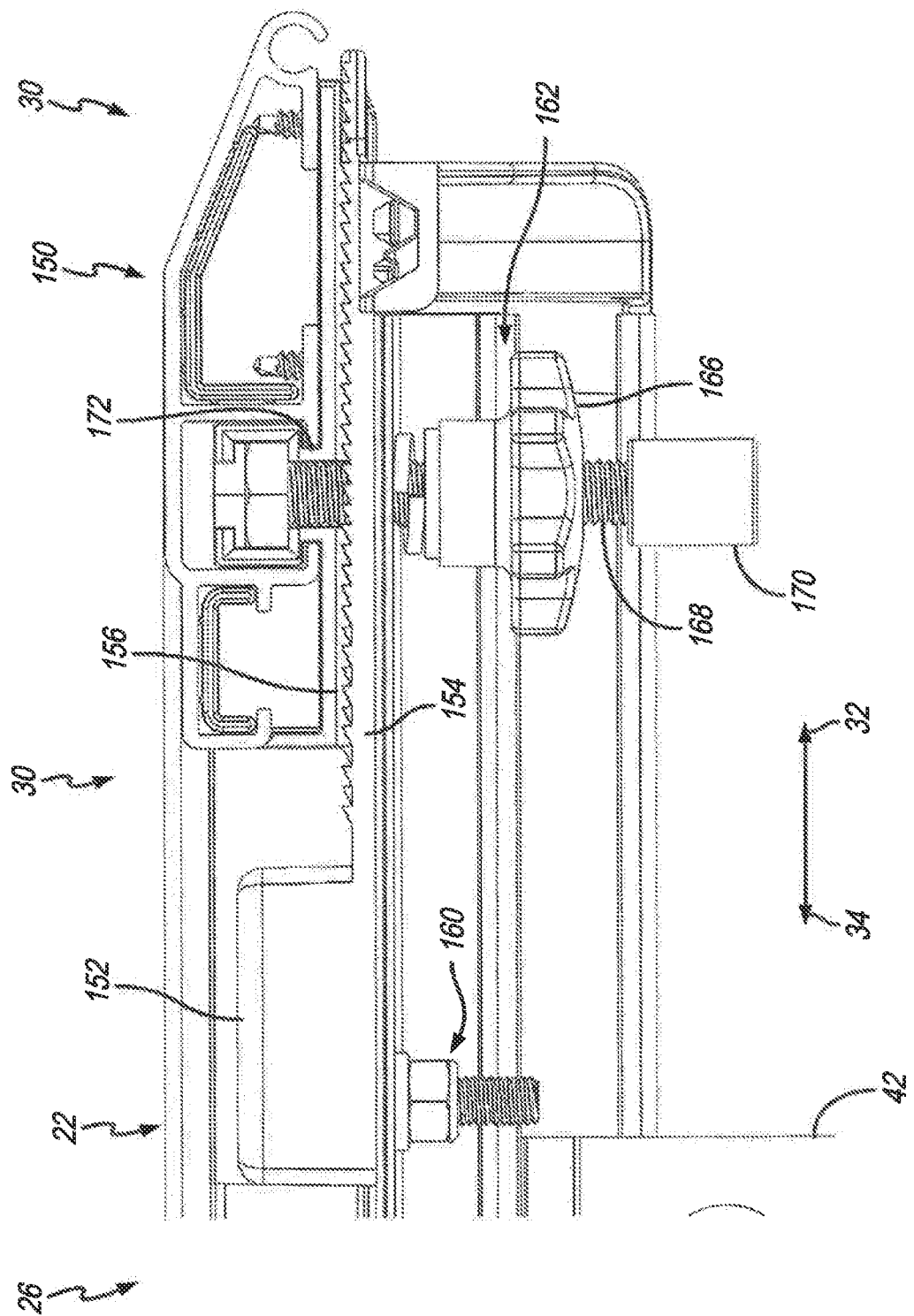
FIG. 13 is a side cross-sectional detail view of the tensioning assembly.
Figure 14:
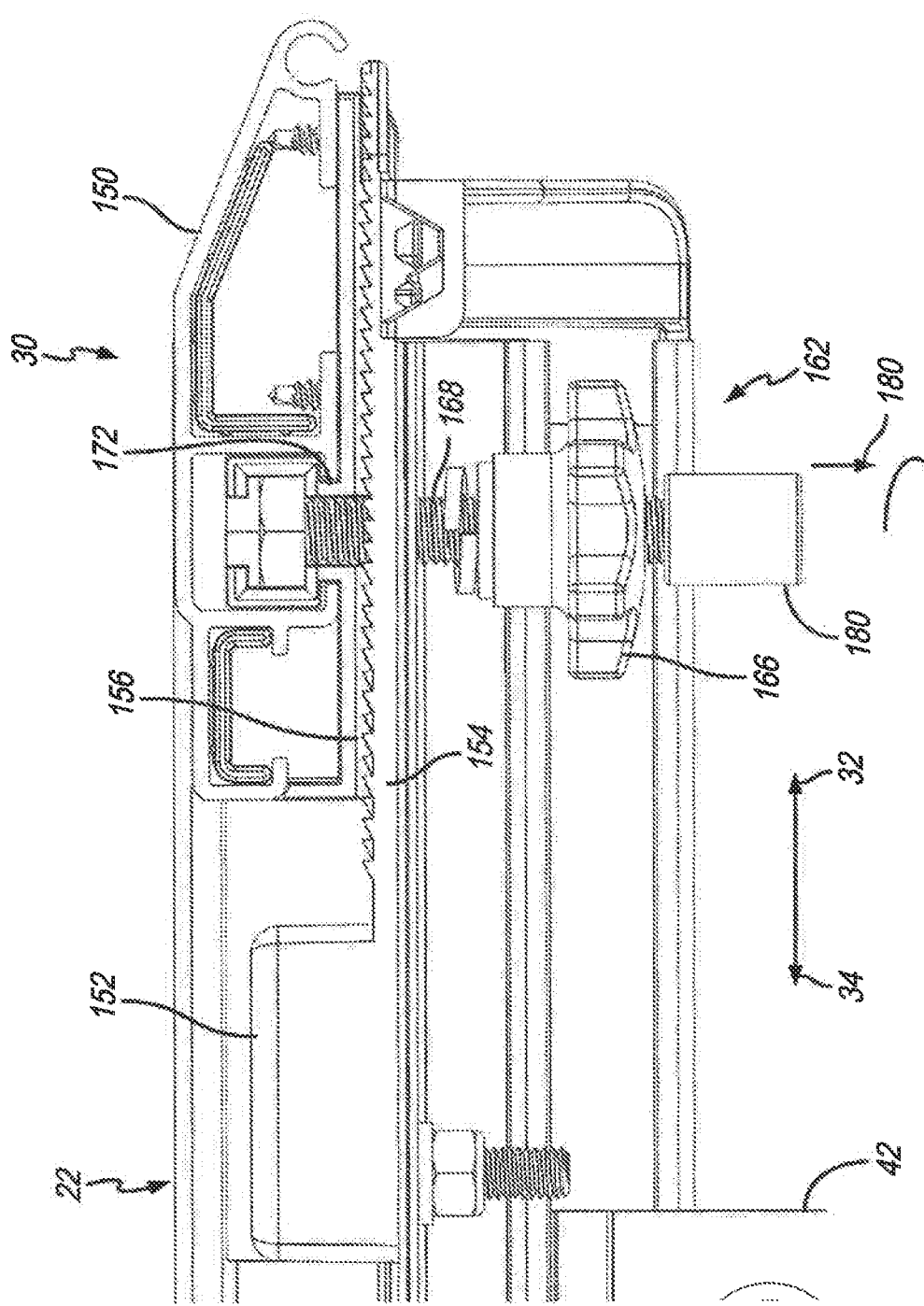
FIG. 14 is another side cross-sectional detail view of the tensioning assembly.
Figure 15:
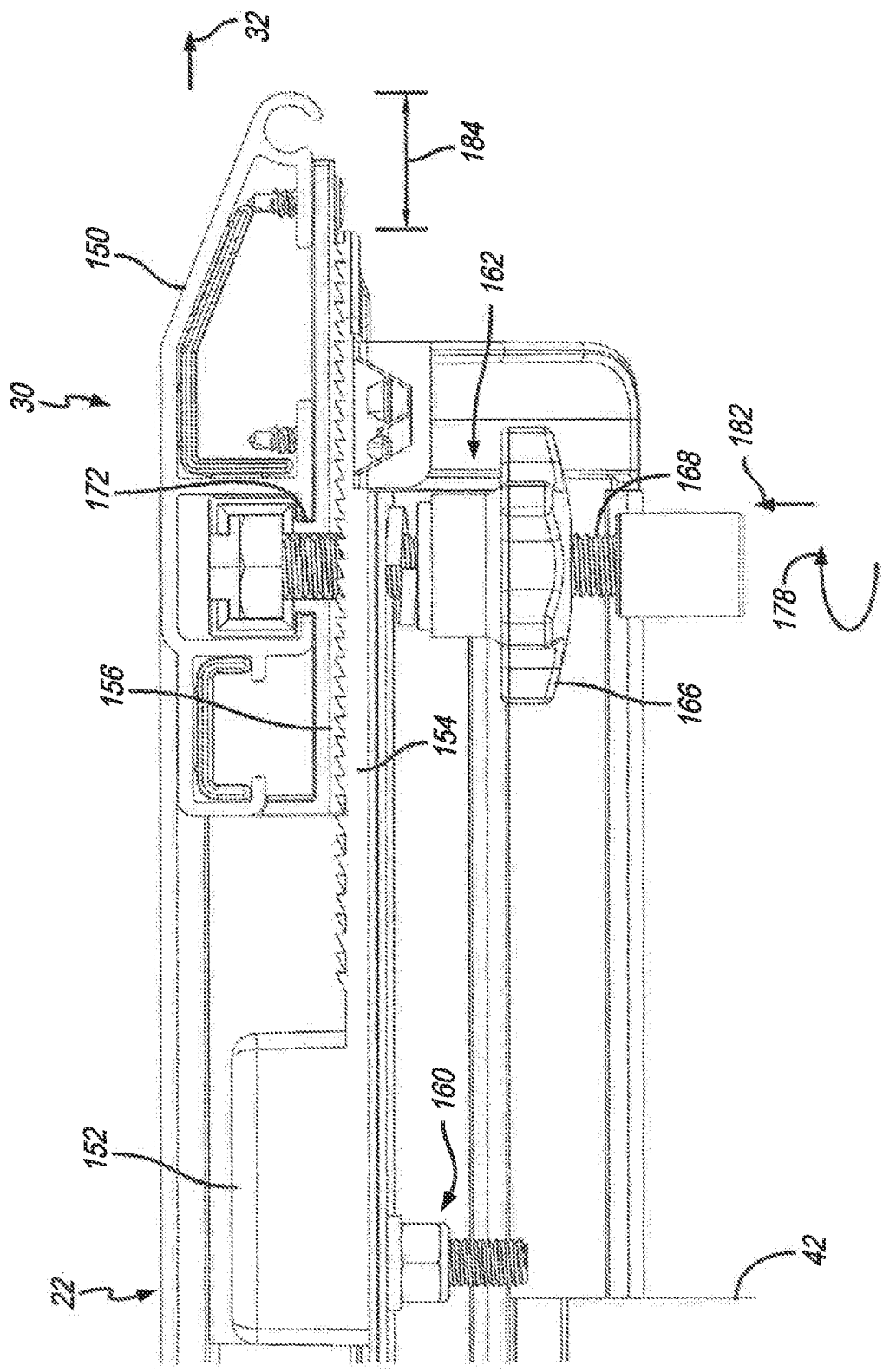
FIG. 15 is another side cross-sectional detail view of the tensioning assembly.

The views in FIGS. 13, 14, and 15 are side cross sectional detail views of tensioning assembly 30. These views are in progression to depict the process of moving tension bar 150 with respect to rail bracket 152 and rail 22. As shown in FIG. 13, toothed surface 156 of tension bar 150 is engaged with toothed surface 154 of rail bracket 152. It is appreciated that one side of each of the toothed surfaces 154 and 156 are angled as illustratively shown in order to prevent tension bar 150 from moving in direction 34 toward the opposite end of rail assembly 26 while each of toothed surfaces 154 and 156 are engaged with each other. Tensioning bolt assembly 162, as shown herein, is tightened down to ensure tension bar 150 is engaged onto rail bracket 152, thereby preventing these two structures from moving with respect to each other. If, under a circumstance, additional tension is needed on roll-up cover 14, it may become necessary to move tension bar 150 in direction 32. This creates further distance between tension bar 150 and end plate assembly 28 on the other side of rail assembly 26.

Accordingly, as shown in FIG. 14, the first step in the process of moving tension bar 150 is to rotate tension knob 166 illustratively in direction 176 to move same in direction 180. This loosens the engagement between toothed surfaces 154 and 156 of rail bracket 152 and tension bar 150, respectively. This allows tension bar 150 to be lifted in direction 182 with respect to rail bracket 152 which separates toothed surfaces 154 and 156. Toothed surfaces 154 and 156 are now able to clear each other allowing tension bar 150 to be moved laterally in either direction 32 or 34 as needed.

As shown in FIG. 15, tension bar 150 has been moved in direction 32, a distance 184, and toothed surface 156 returns engagement with toothed surface 154 of rail bracket 152. This has the effect of increasing the distance between end plate assembly 28 and tensioning assembly 30, which stretches taut roll-up cover 14. Tensioning knob 166 may then be rotated in direction 178, moving same upward in direction 182, to securely sandwich toothed surfaces 154 and 156 together. This prevents any further movement relative to each other. Again, it is appreciated that the process shown in FIGS. 13, 14, and 15 apply in the same manner on the other side of tension bar 150 to secure or release same to or from rail 24.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. It should also be appreciated that, to the extent any subject matter disclosed in this non-provisional Patent Application differs from the priority Application, the disclosure from this non-provisional Patent Application controls.

What is claimed:

1. A tonneau cover assembly that selectively covers a truck bed of a truck, the tonneau cover assembly comprising:
   a cover;
   wherein the cover has a longitudinally extending exterior edge;
   a first portion of a longitudinally extending fastener panel located adjacent the longitudinally extending exterior edge of the cover; and
   a longitudinally extending rib extending from an underside of the cover adjacent the first portion of the longitudinally extending fastener panel;
   wherein the longitudinally extending fastener panel is located between the longitudinally extending rib and the longitudinally extending exterior edge of the cover;
   wherein the longitudinally extending rib includes a tip located distal from the underside of the cover such that the tip is configured to contact a rail located on a sidewall portion of the truck bed to separate a portion of the cover from the rail when the tonneau cover assembly selectively covers the truck bed.

2. The tonneau cover assembly of claim 1, wherein the cover is made of a flexible material.

3. The tonneau cover assembly of claim 1, wherein the longitudinally extending fastener panel is composed of a hook and loop fastener.

4. The tonneau cover assembly of claim 1, wherein the first portion of the longitudinally extending fastener panel is composed of a loop portion of a hook and loop fastener.

5. The tonneau cover assembly of claim 1, wherein the first portion of the longitudinally extending fastener panel is composed of a hook portion of a hook and loop fastener.

6. The tonneau cover assembly of claim 1, further comprising a longitudinally extending rail that includes an attachment member, wherein the attachment member receives a second portion of the longitudinally extending fastener panel that is configured to engage the first portion of the longitudinally extending fastener panel on the cover.

7. The tonneau cover assembly of claim 6, wherein the second portion of the longitudinally extending fastener panel is composed of a hook portion of a hook and loop fastener.

8. The tonneau cover assembly of claim 6, wherein the first portion of the longitudinally extending fastener panel is composed of a loop portion of a hook and loop fastener.

9. The tonneau cover assembly of claim 1, wherein the longitudinally extending rib extending from a stiffener on the underside of the cover.

10. The tonneau cover assembly of claim 8, wherein at least a portion of the attachment member of the longitudinally extending rail is inclined with respect to a top surface a sidewall.

11. The tonneau cover assembly of claim 1, wherein the longitudinally extending rib is located over an interior of the truck bed.

12. A tonneau cover assembly that selectively covers a truck bed of a truck, the tonneau cover assembly comprising:

a cover; and a rib extending from an underside of the cover;

wherein the rib is located over an interior of the truck bed and directed toward the interior of the truck bed; and wherein the rib includes a tip located distal from the underside of the cover.

13. The tonneau cover assembly of claim 12, further comprising a longitudinally extending rail located on a sidewall of the truck bed, wherein the tip of the rib contacts a top surface of the longitudinally extending rail.

14. The tonneau cover assembly of claim 12, wherein the rib extends from the underside surface of cover.

15. The tonneau cover assembly of claim 13, wherein the rib separates a portion of the cover from the longitudinally extending rail.

16. The tonneau cover assembly of claim 13, further comprising a first portion of a longitudinally extending fastener panel located on the cover adjacent the rib, a second portion of a longitudinally extending fastener panel located on the longitudinally extending rail, wherein the longitudinally extending fastener panel is located between the rib and an exterior edge of the cover.

17. A tonneau cover assembly that selectively covers a truck bed of a truck, the tonneau cover assembly comprising:

a longitudinally extending stiffener configured to be located adjacent a lateral end of the tonneau cover assembly, and attached to and supports a portion of a cover material that is more flexible than the stiffener;

wherein the stiffener includes a portion of a longitudinally extending fastener panel;

wherein the stiffener includes a depending rib extending distal from the stiffener;

wherein the rib is located over an interior of the truck bed and directed toward the interior of the truck bed; and wherein the portion of the longitudinally extending fastener panel is located between the depending rib and the lateral end of the tonneau cover assembly.

18. The tonneau cover assembly of claim 17, wherein the stiffener is composed of a material selected from the group consisting of at least one of an extruded rubber and a thermoplastic elastomer.

19. The tonneau cover assembly of claim 17, wherein a portion of the cover material wraps around an edge of the stiffener at the lateral end of the tonneau cover assembly.

* * * * *